(12) United States Patent
Morita

(10) Patent No.: US 10,694,061 B2
(45) Date of Patent: Jun. 23, 2020

(54) IMAGE FORMING APPARATUS

(71) Applicant: KYOCERA Document Solutions Inc., Osaka (JP)

(72) Inventor: Yoshio Morita, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/529,546

(22) Filed: Aug. 1, 2019

(65) Prior Publication Data

US 2020/0053243 A1    Feb. 13, 2020

(30) Foreign Application Priority Data

Aug. 10, 2018 (JP) .................................. 2018-151730

(51) Int. Cl.
*H04N 1/00* (2006.01)
(52) U.S. Cl.
CPC ..... *H04N 1/00875* (2013.01); *H04N 1/00846* (2013.01); *H04N 2201/0094* (2013.01)
(58) Field of Classification Search
None
See application file for complete search history.

(56) References Cited

U.S. PATENT DOCUMENTS

| 2007/0229920 A1* | 10/2007 | Fukushima | H04N 1/00795 358/488 |
| 2008/0144090 A1* | 6/2008 | Kimura | H04N 1/00204 358/1.15 |
| 2009/0153901 A1* | 6/2009 | Imamura | G06F 21/608 358/1.15 |
| 2012/0183182 A1* | 7/2012 | Kumar | G06K 9/00442 382/119 |
| 2012/0229835 A1* | 9/2012 | Tawada | H04N 1/4413 358/1.13 |

FOREIGN PATENT DOCUMENTS

JP    H 07-038749 A    2/1995

* cited by examiner

*Primary Examiner* — Andrew H Lam
(74) *Attorney, Agent, or Firm* — Stein IP, LLC

(57) ABSTRACT

An image forming apparatus has an image reading portion generating document image data, a job execution portion executing a job based on the document image data, a control portion controlling the job execution portion, and a storage portion storing a registered signature image. The control portion determines the degree of match between a document signature image present in the document image data and the registered signature image. The control portion permits execution of the job when the degree of match is equal to or higher than a first threshold value and inhibits execution of the job when the degree of match is lower than the first threshold value.

7 Claims, 6 Drawing Sheets

IMAGE FORMING APPARATUS

INCORPORATION BY REFERENCE

The present application is based on, and claims priority from, Japanese Patent Application No. 2018-151730, filed on Aug. 10, 2018, the disclosure of which is hereby incorporated by reference herein in its entirety.

BACKGROUND

The present disclosure relates to an image forming apparatus that can execute a job based on document image data obtained by reading a document.

Some conventional image forming apparatuses include an image reading portion that reads a document to generate document image data. Such image forming apparatuses can execute jobs based on the document image data, such as a copy job in which they print an image based on the document image data on a sheet.

There have conventionally been proposed image forming apparatuses that are provided with a function of restricting execution of a copy job. A conventional image forming apparatus determines, based on the document image data of a document read by an image reading portion, whether or not an image is present in a predetermined region on the read document. If an image is present in the predetermined region on the read document, execution of a copy job based on the document image data is inhibited.

SUMMARY

According to one aspect of the present disclosure, an image forming apparatus includes an image reading portion, a job execution portion, a control portion, and a storage portion. The image reading portion reads a document to generate document image data. The job execution portion executes a job based on the document image data. The control portion controls the job execution portion. The storage portion stores a registered signature image which is an image of a previously registered signature. The control portion determines the degree of match between a document signature image, which is an image included in the document image data and corresponding to the signature written on the document, and the registered signature image. If the degree of match between the document signature image and the registered signature image is equal to or higher than a prescribed first threshold value, the control portion permits execution of the job; if the degree of match between the document signature image and the registered signature image is lower than the first threshold value, the control portion inhibits execution of the job.

DETAILED DESCRIPTION OF PREFERRED EMBODIMENTS

Hereinafter, one embodiment of the present disclosure will be described, taking as an example an image forming apparatus (multifunction peripheral) that can execute a copy job and a transmission job.

Figure 1:
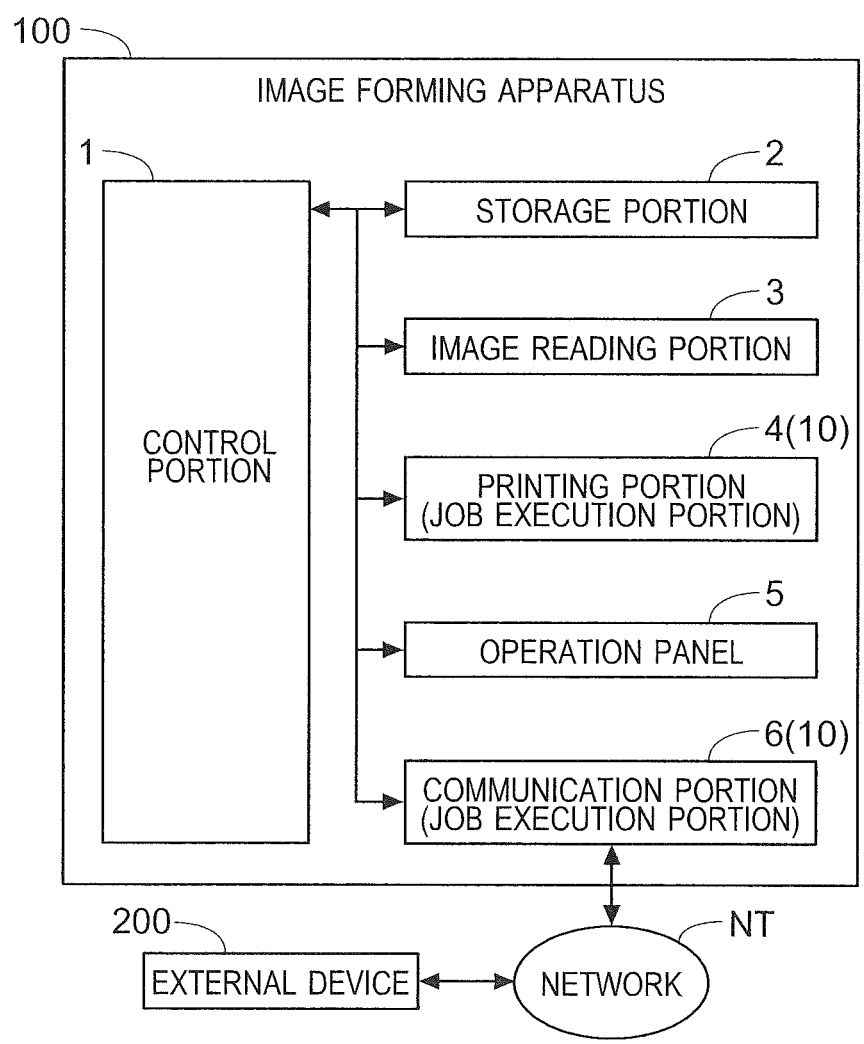
FIG. 1 is a block diagram showing a configuration of an image forming apparatus according to one embodiment.

Configuration of an Image Forming Apparatus: As shown in FIG. 1, the image forming apparatus 100 according to the embodiment includes a control portion 1 and a storage portion 2. The control portion 1 includes a CPU. The control portion 1 controls different blocks in the image forming apparatus 100 based on control programs and control data. The control portion 1 also performs image processing on image data that is used in a copy job or a transmission job. The storage portion 2 includes a storage device such as a ROM, a RAM, and a HDD. The storage portion 2 is connected to the control portion 1. The control programs and control data are stored in the storage portion 2.

Figure 2:
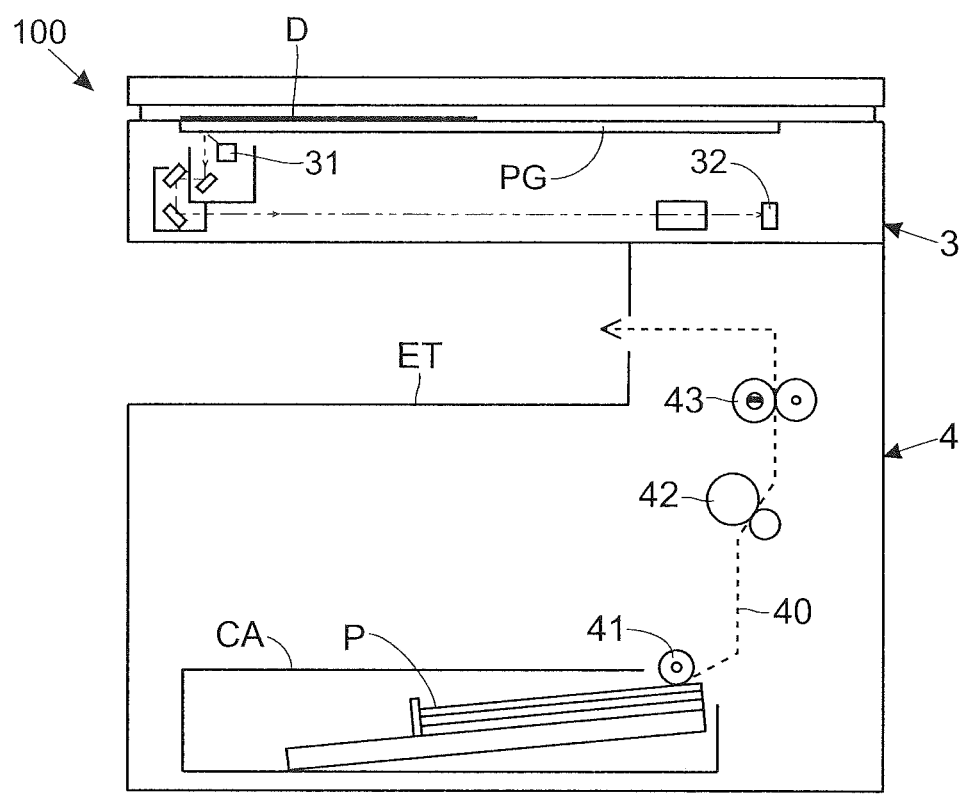
FIG. 2 is a schematic diagram showing the configuration of the image forming apparatus according to the one embodiment.

The image forming apparatus 100 also includes an image reading portion 3 and a printing portion 4. The image reading portion 3 and the printing portion 4 are connected to the control portion 1. The control portion 1 controls the image reading portion 3 and the printing portion 4. The image reading portion 3 and the printing portion 4 are schematically shown in FIG. 2.

The image reading portion 3 reads a document D to generate the image data (hereinafter referred to as document image data) of the document D. The document D as the reading target is placed on a platen glass PG. In a copy job and a transmission job, the document image data is used. That is, a copy job and a transmission job are jobs that involve reading of a document D by the image reading portion 3.

The image reading portion 3 includes optical members for optical reading of the document D. The optical members include a light source 31 and an image sensor 32. The light source 31 shines light on the document D on the platen glass PG. The image sensor 32 receives the light reflected from the document D and performs photoelectric conversion.

The printing portion 4 conveys a sheet P along a sheet conveying passage 40 (indicated by a broken-line arrow in FIG. 2), and forms an image to be printed. The printing portion 4 prints the image on the sheet P being conveyed. In a copy job, printing of an image based on document image data is performed by the printing portion 4. In other words, the printing portion 4 executes a job (copy job) based on document image data.

The printing portion 4 includes a sheet feed roller 41. The sheet feed roller 41 is in contact with a sheet P stored in a sheet cassette CA, in which state the sheet feed roller 41 rotates and thereby feeds the sheet P from the sheet cassette CA into the sheet conveying passage 40. On the downstream side of the sheet feed roller 41 in the sheet conveying direction, there is provided, though not shown, a separation roller that separates sheets that are pulled together out of the sheet cassette CA into one-by-one sheets.

The printing portion 4 also includes a pair of transfer rollers 42. The pair of transfer rollers 42 includes a photosensitive drum and a transfer roller. The photosensitive drum carries a toner image around its circumferential face. The transfer roller is in pressed contact with the photosensitive drum, and forms a transfer nip with it. The pair of transfer rollers 42 rotates, and thereby, while conveying the sheet P that has entered the transfer nip, transfers the toner image to the sheet P.

The printing portion 4 includes, though not shown, a charging device, an exposing device, and a developing device. The charging device electrostatically charges the circumferential face of the photosensitive drum. The exposing device forms an electrostatic latent image on the circumferential face of the photosensitive drum. The developing device develops the electrostatic latent image into a toner image.

The printing portion 4 includes a pair of fixing rollers 43. The pair of fixing rollers 43 includes a heating roller and a pressing roller. The heating roller incorporates a heater (not shown). The pressing roller is in pressed contact with the heating roller, and forms a fixing nip with it. The pair of fixing rollers 43 rotates, and thereby, while conveying the sheet P that has entered the fixing nip, fixes to the sheet P the toner image transferred to the sheet P. The sheet P that has left the fixing nip is ejected onto an ejection tray ET.

With reference back to FIG. 1, the image forming apparatus 100 includes an operation panel 5. The operation panel 5 includes a touch screen and hardware buttons. The touch screen displays a screen that shows software buttons, and accepts touch operations from the user. A plurality of hardware buttons are provided on the operation panel 5. The hardware buttons include, among others, a Start button for accepting from the user a request to execute a job that involves reading of a document D.

The operation panel 5 is connected to the control portion 1. The control portion 1 controls display operation on the operation panel 5. The control portion 1 also senses operation performed on the operation panel 5. On sensing operation on the Start button on the operation panel 5 with a document D placed on the platen glass PG, the control portion 1 recognizes that it has received a request to execute a job that involves reading of the document D, and makes the image reading portion 3 read the document D.

The image forming apparatus 100 includes a communication portion 6. The communication portion 6 is a communication interface that connects the image forming apparatus 100 to a network NT such as a LAN, and includes a communication circuit, a communication connector, and the like. The communication portion 6 is connected to the control portion 1. The control portion 1 controls the communication portion 6.

To the network NT are connected various external devices 200 such as a facsimile machine, a server, a user terminal (personal computer) used by the user of the image forming apparatus 100, and the like. When connected to the network NT, the image forming apparatus 100 can execute a transmission job. In a transmission job, the control portion 1 generates data for transmission based on document image data. Then the control portion 1 makes the communication portion 6 transmit the data for transmission to the external device 200. In other words, the communication portion 6 executes a job (transmission job) based on document image data.

The printing portion 4 and the communication portion 6 execute jobs based on document image data, and thus correspond to a "job execution portion". In the following description, unless distinction is required, the printing portion 4 and the communication portion 6 are collectively referred to as the job execution portion and identified by the reference sign "10".

Job Restricting Function: The image forming apparatus 100 is provided with a job restricting function, that is, a function whereby it restricts execution of jobs (such as a copy job and a transmission job) based on document image data. Using the job restricting function allows managing whether to permit execution of a job for each document D.

Use of the job restricting function requires previous registration of a signature. For example, a user writes his signature on a sheet P by hand writing, and makes the image forming apparatus 100 read the sheet P with a hand-written signature on it. In this way, the user can register his hand-written signature.

The operation panel 5 accepts previous registration of a signature from a user. When registering the hand-written signature, the user performs prescribed mode switching operation on the operation panel 5 to switch the image forming apparatus 100 to a signature registration mode. Then the user places on the platen glass PG a sheet P with his hand-written signature written on it, and in that state, the user operates the Start button on the operation panel 5.

The control portion 1 recognizes an image region in the image data obtained through reading by the image reading portion 3 in the signature registration mode. Then the control portion 1 extracts the image present in the image region in the image data as the image of the hand-written signature to be registered this time, and makes the storage portion 2 store the thus extracted image of the hand-written signature. In the following description, an image of a hand-written signature stored in the storage portion 2 (a registered hand-written signature) is referred to as a registered signature image.

In a case where there are a plurality of users who use the job restricting function, those user register their respective hand-written signatures. That is, a plurality of registered signature images are stored in the storage portion 2.

Here, when the operation panel 5 accepts signature registration, it accepts from the user choice of whether the signature registered this time is a specific signature or a regular signature. If the operation panel 5 accepts the choice of the specific signature for the signature registered this time, the control portion 1 associates the registered signature image with specific signature information (information indicating that the signature corresponding to the registered signature image is the specific signature). If the operation panel 5 accepts the choice of the regular signature for the signature registered this time, the control portion 1 associates the registered signature image with regular signature information (information indicating that the signature corresponding to the registered signature image is the regular signature). In the following description, the registered signature image corresponding to the specific signature is referred to as a specific signature image, and the registered signature image corresponding to the regular signature is referred to as a regular signature image.

When accepting signature registration, the operation panel 5 also accepts from the user set content of job settings to be associated with the signature registered this time. For example, setting values for setting items, such as page consolidation and two-sided printing, for which setting values can be set freely can be associated with a signature. No set content of job settings may be associated with a signature. When the operation panel 5 accepts set content of job settings to be associated with the signature registered this time, the control portion 1 associates the registered signature image with the job setting information indicating the set content of the job settings that the operation panel 5 has accepted.

When the job restricting function is used, it has to be enabled. By default, the job restricting function is disabled. The operation panel 5 accepts whether to enable or disable the job restricting function from a user. When the operation panel 5 accepts an instruction to enable the job restricting function, the control portion 1 enables the job restricting function.

When, with the job restricting function enabled, the image reading portion 3 reads a document D and generates document image data, the control portion 1 performs a permission judgment process to decide whether or not to permit execution of a job based on the document image data. If the permission judgment process by the control portion 1 gives a permission, the job is executed; if not, execution of the job is inhibited. In this way, execution of a job based on document image data is restricted.

The permission judgment process by the control portion 1 is performed based on the degree of match between the image of the hand-written signature written on the document D read by the image reading portion 3 (which image will hereinafter be referred to as a document signature image) and the registered signature image. That is, to make the image forming apparatus 100 execute a job requires that at least a hand-written signature be written on the document D which is the reading target.

Figure 3:
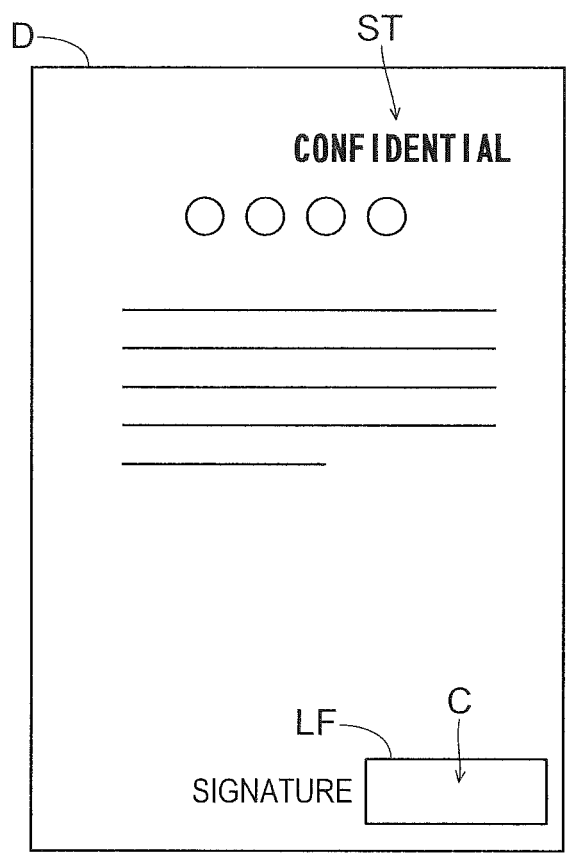
FIG. 3 is a diagram showing one example of a document read by an image reading portion in the image forming apparatus according to the one embodiment.

For example, a document D has a signature box C (see FIG. 3). In other words, when creating a document D, the author makes the signature box C on it. There is no particular restriction on the form of the signature box C. The signature box C can be, for example, as shown in FIG. 3, the region inside a lined frame LF. For another example, though not shown, the signature box C can be a region immediately over a line (underline). For yet another example, the signature box C can be a region close to (for example, neighboring on the right side of) the image of a prescribed character string such as "SIGNATURE". For still another example, the signature box C can be a region close to (for example, neighboring on the right side of) a prescribed symbol (mark) or the like.

Now, with reference to the flow chart in FIG. 4, the procedure of the permission judgment process performed by the control portion 1 will be described. The procedure shown in FIG. 4 starts when, with the job restricting function enabled, the image reading portion 3 reads a document D. When the image reading portion 3 reads the document D, the control portion 1 acquires the document image data of the document D (hereinafter referred to as a read document D) read this time by the image reading portion 3. It is here assumed that, at the start of the procedure shown in FIG. 4, a user authorized to use the image forming apparatus 100 has logged in to it.

At Step S1, the control portion 1 recognizes the user currently logged in to the image forming apparatus 100. The control portion 1 then checks whether or not the current logged-in user is a specific user. If the control portion 1 judges the current logged-in user not to be a specific user, the procedure proceeds to Step S2.

For example, to be able to use the image forming apparatus 100, a user has to have previously registered his user information (a user ID and a password). The registered-user information thus previously registered is stored in the storage portion 2. When using the image forming apparatus 100, the user enters his user information on the operation panel 5.

The control portion 1 recognizes the user information entered on the operation panel 5, and if registered-user information that matches the entered user information is stored in the storage portion 2, the control portion 1 brings the image forming apparatus 100 into a logged-in state. Now the user can use the image forming apparatus 100.

Here, the registered-user information of a specific user includes additional information that indicates that this user is a specific user. If registered-user information corresponding to a logged-in user includes additional information, the control portion 1 judges the logged-in user to be a specific user; if registered-user information corresponding to a logged-in user does no include additional information, the control portion 1 judges the logged-in user not to be a specific user.

At Step S2, based on the document image data of the read document D, the control portion 1 checks whether or not a signature is written in the signature box C on the read document D (whether or not an image is present in the region corresponding to the signature box C in the document image data of the read document D). If the control portion 1 judges that a signature is written in the signature box C on the read document D, the procedure proceeds to Step S3.

At Step S3, the control portion 1 checks whether or not the read document D is a condition-fulfilling document D', that is, a document that fulfills a prescribed condition. For example, if predetermined information is present in the document image data of the read document D, the control portion 1 judges the read document D to be the condition-fulfilling document D'.

Predetermined information is previously registered by a user. Registration of predetermined information is accepted from a user on the operation panel 5. The predetermined information registered by the user is stored in the storage portion 2. Registered as predetermined information are, for example, the images of character strings such as "CONFIDENTIAL" and "FOR INTERNAL USE ONLY" or, instead, the text data of character strings such as "CONFIDENTIAL" and "FOR INTERNAL USE ONLY".

In a case where the image of a character string is registered as predetermined information, the control portion 1 checks, by a well-known process such as template matching, whether or not an image of which the degree of match with the predetermined information (image) is equal to or higher than a prescribed threshold value is present in the document image data of a read document D. If an image of which the degree of match with the predetermined information (image) is equal to or higher than the prescribed threshold value is present in the document image data of the read document D, the control portion 1 judges the read document D to be the condition-fulfilling document D'.

In a case where the text data of a character string is registered as predetermined information, the control portion 1 performs character recognition on the document image data of a read document D to extract text data from the document image data of the read document D. Then the control portion 1 checks whether or not the predetermined information (text data) is present in the text data extracted from the document image data of the read document D. If the predetermined information (text data) is present in the extracted text data, the control portion 1 judges the read document D to be the condition-fulfilling document D'.

In general, character strings such as "CONFIDENTIAL" and "FOR INTERNAL USE ONLY" are put on sensitive documents (such as classified documents). Accordingly, in the process at Step S3, if the read document D is a sensitive one, the read document D is judged to be the condition-fulfilling document D'. For example, the read document D shown in FIG. 3 bears a character string ST that reads "CONFIDENTIAL". Thus, the read document D shown in FIG. 3 is the condition-fulfilling document D'.

The check of whether or not the read document D is the condition-fulfilling document D' may be made based on the format of the read document D. In that case, format information (information indicating the format of the sensitive document) is stored in the storage portion 2. Based on the format information, the control portion 1 checks whether or not the format of the read document D is that of the sensitive document. If the format of the read document D is that of the sensitive document, the control portion 1 judges the read document D to be the condition-fulfilling document D'.

If, at Step S3, the control portion 1 judges the read document D to be the condition-fulfilling document D', the procedure proceeds to Step S4. At Step S4, the control portion 1 recognizes, as the document signature image, the image inside the region corresponding to the signature box C in the document image data of the read document D. Then the control portion 1 performs a matching process in which it compares the specific signature image among registered signature images with the document signature image to determine the degree of match between those images.

In the matching process (process for determining the degree of match) by the control portion 1, a well-known matching technique is used. For example, the control portion 1 determines the degree of match by arithmetically calculating the degree of overlap between the specific signature image and the document signature image. For another example, the control portion 1 extracts characteristic components from each of the specific signature image and the document signature image. The characteristic components so extracted are, among others, the outlines of the images, the shapes of the images, the directions of the lines composing the images, and the thicknesses of the lines composing the images. Then, based on the characteristic components of the specific signature image and the document signature image respectively, the control portion 1 determines the degree of match.

Then the control portion 1 checks whether or not the specific signature image of which the degree of match with the document signature image is equal to or higher than a prescribed first threshold value is stored in the storage portion 2. If the control portion 1 finds that the specific signature image of which the degree of match with the document signature image is equal to or higher than the first threshold value is stored in the storage portion 2, the procedure proceeds to Step S5. For example, the first threshold value is set at 80%. The first threshold value can be changed freely by the user. A change to the first threshold value is accepted from the user on the operation panel 5.

Figure 5:
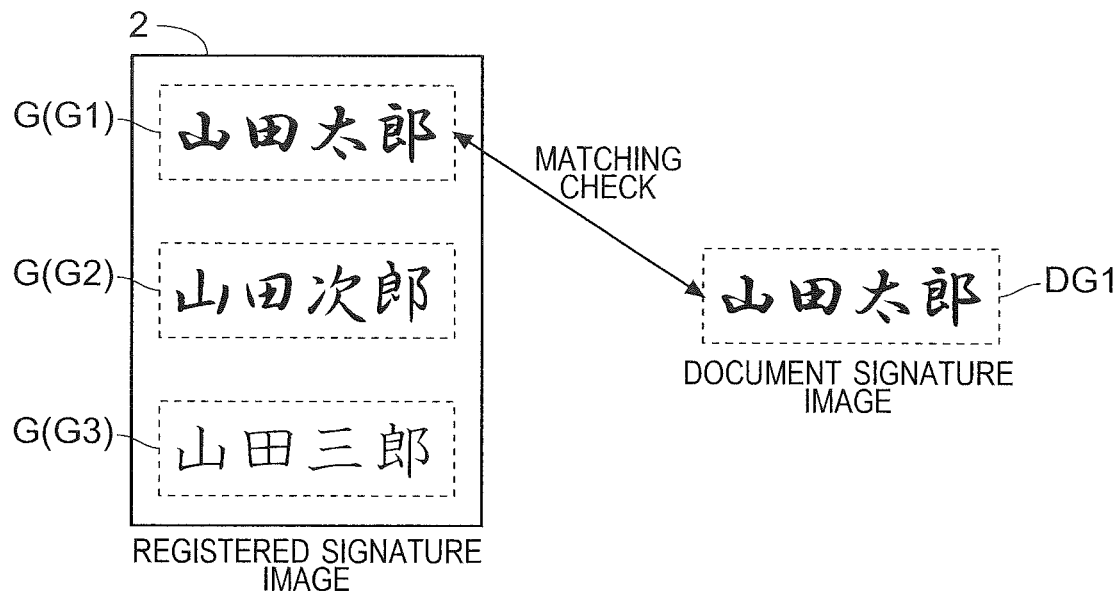
FIG. 5 is a diagram illustrating a matching process performed as part of the permission judgment process by the control portion in the image forming apparatus according to the one embodiment.

For example, suppose that a plurality of registered signature images G as shown in the left part of FIG. 5 are stored in the storage portion 2. It is here assumed that, of those registered signature images G, the registered signature image G1 is the specific signature image and the registered signature images G2 and G3 are the regular signature images. It is also assumed that a document signature image DG1 as shown in the right part of FIG. 5 is present in the region corresponding to the signature box C in the document image data of the read document D.

In the example shown in FIG. 5, the degree of match between the specific signature image G1 and the document signature image DG1 is determined. Here, it is assumed that the user who registered the specific signature image G1 signed in the signature box C on the read document D. In that case, the degree of match between the specific signature image G1 and the document signature image DG1 is equal to or higher than the first threshold value. Accordingly, in this example, it is judged that the specific signature image of which the degree of match with the document signature image is equal to or higher than the first threshold value is stored in the storage portion 2.

With reference back to FIG. 4, at Step S5, the control portion 1 takes as a similar signature image the specific signature image of which the degree of match with the document signature image is equal to or higher than the first threshold value. At Step S6, the control portion 1 checks whether or not the degree of match between the document signature image and the similar signature image is lower than a prescribed second threshold value higher than the first threshold value. If the control portion 1 judges that the degree of match between the document signature image and the similar signature image is lower than the second threshold value, the procedure proceeds to Step S7.

At Step S7, the control portion 1 permits execution of a job based on the document image data of the read document D. Then, at Step S8, the control portion 1 makes the job execution portion 10 execute a job based on the document image data of the read document D.

When the job to be executed is a copy job, the control portion 1 makes the printing portion 4 print an image based on the document image data of the read document D on a sheet P. When the job to be executed is a transmission job, the control portion 1 generates data for transmission based on the document image data of the read document D, and makes the communication portion 6 transmit the generated data for transmission to an external device 200.

At that time, the control portion 1 recognizes the job setting information that is associated with the similar signature image (the specific signature image of which the degree of match with the document signature image is equal to or higher than the first threshold value but lower than the second threshold value), and makes the job execution portion 10 execute the job based on the set content of the job settings indicated by the so recognized job setting information. For example, if, as job setting information, information indicating that page consolidation is on is associated with the similar signature image, then even if page consolidation is set to off by the user who is now requesting execution of the job, page consolidation is forcibly set to on. If no job setting information is associated with the similar signature image, the job is executed according to the set content of the job settings that the user now requesting execution has set.

If, at Step S6, the control portion 1 judges that the degree of match between the document signature image and the similar signature image is equal to or higher than the second threshold value, the procedure proceeds to Step S9. At Step S9, the control portion 1 inhibits execution of a job based on the document image data of the read document D. For example, the second threshold value is set at 95%. The second threshold value can be changed freely by the user. A change to the second threshold value is accepted from the user on the operation panel 5.

For example, suppose that, in the example shown in FIG. 5, the degree of match between the specific signature image G1 and the document signature image DG1 is equal to or higher than the second threshold value. In that case, although the degree of match between the specific signature image G1 and the document signature image DG1 is equal to or higher than the first threshold value, because the degree of match between the specific signature image G1 and the document signature image DG1 is equal to or higher than the second threshold value (the specific signature image G1 and the document signature image DG1 substantially match), execution of a job is inhibited.

Also if, at Step S4, the control portion 1 finds that the specific signature image of which the degree of match with the document signature image is equal to or higher than the first threshold value is not stored in the storage portion 2, the procedure proceeds to Step S9. That is, execution of a job based on the document image data of the read document D is inhibited.

Figure 6:
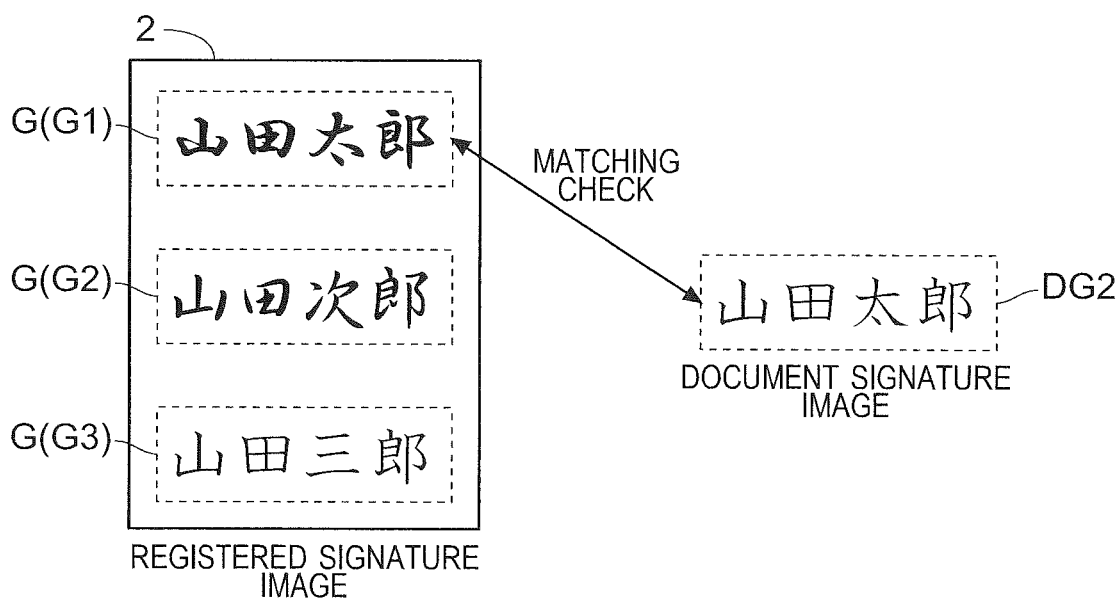
FIG. 6 is a diagram illustrating the matching process performed as part of the permission judgment process by the control portion in the image forming apparatus according to the one embodiment.

For example, suppose that a plurality of registered signature images G as shown in the left part of FIG. 6 are stored in the storage portion 2. The registered signature images G shown in the left part of FIG. 6 are the same as those in the example in the left part of FIG. 5. It is assumed that a document signature image DG2 as shown in the right part of FIG. 6 is present in the region corresponding to the signature box C in the document image data of the read document D.

In the example shown in FIG. 6, the degree of match between the specific signature image G1 and the document signature image DG2 is determined. Here, the handwriting style of the specific signature image G1 differs from that of the document signature image DG2. Thus, the degree of match between the specific signature image G1 and the document signature image DG2 is lower than the first threshold value. Accordingly, in this example, it is judged that the specific signature image of which the degree of match with the document signature image is equal to or higher than the first threshold value is not stored in the storage portion 2.

Figure 7:
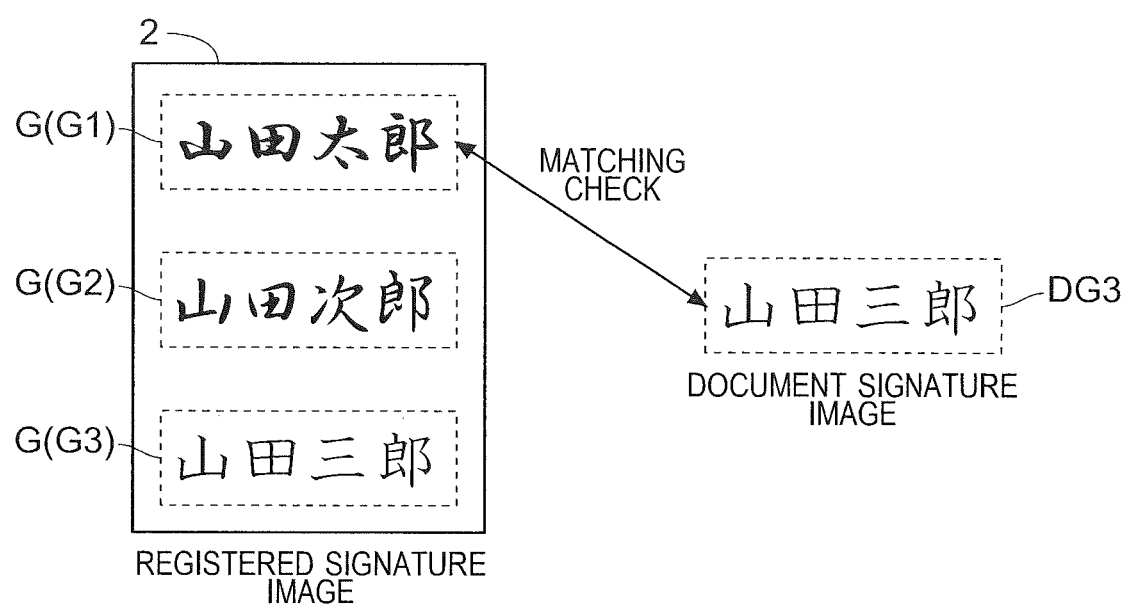
FIG. 7 is a diagram illustrating the matching process performed as part of the permission judgment process by the control portion in the image forming apparatus according to the one embodiment.

For another example, suppose that a plurality of registered signature images G as shown in the left part of FIG. 7 are stored in the storage portion 2. The registered signature images G shown in the left part of FIG. 7 are the same as those in the example in the left part of FIG. 5. It is assumed that a document signature image DG3 as shown in the right part of FIG. 7 is present in the region corresponding to the signature box C in the document image data of the read document D.

In the example shown in FIG. 7, the degree of match between the specific signature image G1 and the document signature image DG3 is determined. Here, the specific signature image G1 is distinct from the document signature image DG3. Thus, the degree of match between the specific signature image G1 and the document signature image DG3 is lower than the first threshold value. Accordingly, in this example, it is judged that the specific signature image of which the degree of match with the document signature image is equal to or higher than the first threshold value is not stored in the storage portion 2.

Suppose that the specific signature image is not registered. Also in this case, it is judged that the specific signature image of which the degree of match with the document signature image is equal to or higher than the first threshold value is not stored in the storage portion 2.

With reference back to FIG. 4, if, at Step S3, the control portion 1 judges the read document D not to be the condition-fulfilling document D', the procedure proceeds to Step S10. At Step S10, the control portion 1 recognizes, as the document signature image, the image inside the region corresponding to the signature box C in the document image data of the read document D. Then the control portion 1 performs a matching process to check whether or not the registered signature image of which the degree of match with the document signature image is equal to or higher than the first threshold value is stored in the storage portion 2. The matching process performed here is similar to that at Step S4.

At Step S10, if the control portion 1 judges that the registered signature image of which the degree of match with the document signature image is equal to or higher than the first threshold value is stored in the storage portion 2, the procedure proceeds to Step S11; if the control portion 1 judges that the registered signature image of which the degree of match with the document signature image is equal to or higher than the first threshold value is not stored in the storage portion 2, the procedure proceeds to Step S9. At Step S11, the control portion 1 takes as the similar signature image the registered signature image of which the degree of match with the document signature image is equal to or higher than the first threshold value. Then the procedure proceeds to Step S6.

Here, in a case where the procedure has proceeded from Step S10 to Step S11, if the specific signature image of which the degree of match with the document signature image is equal to or higher than the first threshold value is stored in the storage portion 2, the control portion 1 takes as the similar signature image the specific signature image of which the degree of match with the document signature image is equal to or higher than the first threshold value. Even if the specific signature image of which the degree of match with the document signature image is equal to or higher than the first threshold value is not stored in the storage portion 2, if the regular signature image of which the degree of match with the document signature image is equal to or higher than the first threshold value is stored in the storage portion 2, the control portion 1 takes as the similar signature image, the regular signature image of which the degree of match with the document signature image is equal to or higher than the first threshold value. That is, if the degree of match between any of the registered signature image and the document signature image is equal to or higher than the first threshold value, the control portion 1 takes as the similar signature image the registered signature image of which the degree of match with the document signature image is equal to or higher than the first threshold value.

For example, suppose that, in the example shown in FIG. 7, the user who registered the regular signature image G3 singed in the signature box C on the read document D. In this case, the degree of match between the regular signature image G3 and the document signature image DG3 is equal to or higher than the first threshold value. Accordingly, the regular signature image G3 is taken as the similar signature image.

If, at Step S2, the control portion 1 judges that no signature is written in the signature box C on the read document D, the procedure proceeds to Step S9. That is, also if no signature is written in the signature box C on the read document D, execution of a job based on the document image data of the read document D is inhibited.

If, at Step S1, the control portion 1 judges that the current logged-in user is a specific user, the procedure proceeds to Step S7. That is, if the user who is requesting execution of a job is a specific user, execution of a job is not inhibited.

Figure 4:
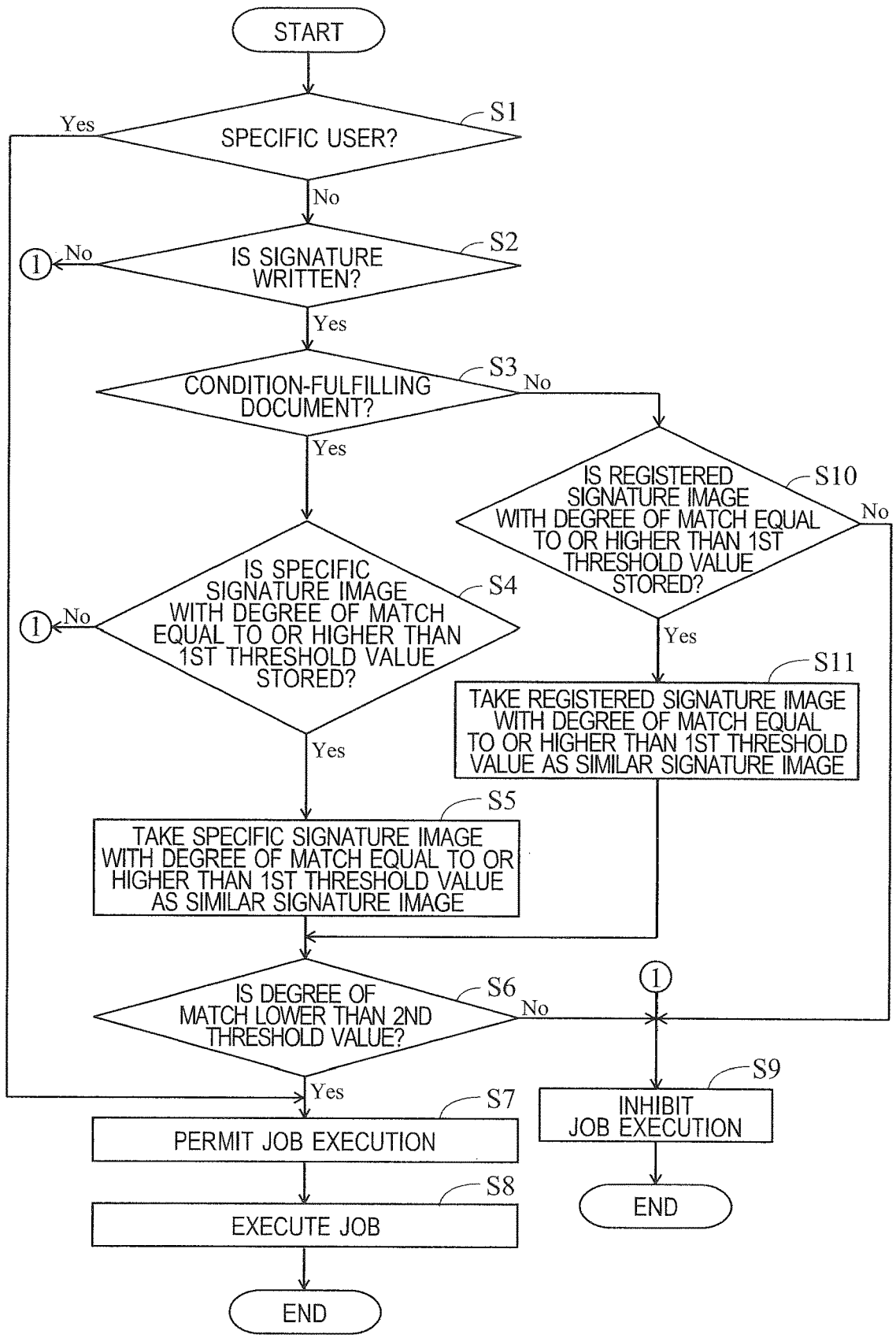
FIG. 4 is a flow chart showing the procedure of a permission judgment process performed by a control portion in the image forming apparatus according to the one embodiment.

As a modified example, in the flow chart in FIG. 4, the process at Step S1 may be omitted. In that case, regardless of who the user requesting execution of a job is (who the current logged-in user is), a judgment of whether or not to permit execution of a job based on the document image data of the read document D is made based on the signature written on the read document D.

The judgment of whether or not to permit execution of a job based on the document image data of the read document D may be made only when the read document D is the condition-fulfilling document D'.

Even if the read document D is the condition-fulfilling document D', if the degree of match between any of the registered signature image and the document signature image is equal to or higher than the first threshold value but lower than the second threshold value, execution of a job based on the document image data of the read document D may be permitted.

When the degree of match between the document signature image and the registered signature image is equal to or higher than the first threshold value, regardless of whether or not the degree of match between the document signature image and the registered signature image is lower than the second threshold value, execution of a job based on the document image data of the read document D may be permitted.

The image forming apparatus 100 according to the embodiment includes, as described above: the image reading portion 3 that generates the document image data of a read document D; the printing portion 4 (job execution portion 10) that executes a copy job to print an image based on the document image data of the read document D on a sheet P; the communication portion 6 (job execution portion 10) that executes a transmission job to transmit data for transmission that is generated based on the document image data of the read document D to the external device 200; the control portion 1 that controls the job execution portion 10; and the storage portion 2 that stores a registered signature image which is the image of a previously registered signature. The control portion 1 determines the degree of match between a document signature image, which is an image present in the document image data of the read document D and corresponding to a signature written on the read document D, and the registered signature image. If the degree of match between the document signature image and the registered signature image is equal to or higher than a prescribed first threshold value, the control portion 1 permits execution of a job based on the document image data of the read document D; if the degree of match between the document signature image and the registered signature image is lower than the first threshold value, the control portion 1 inhibits execution of a job based on the document image data of the read document D.

With the configuration according to the embodiment, if no document signature image of which the degree of match with the registered signature image is equal to or higher than the first threshold value is present in the document image data (that is, unless a user who registered a signature signed the read document D), a job based on the document image data is not executed on the image forming apparatus 100. To make the image forming apparatus 100 execute a job based on the document image data, the user with the registered signature has to be requested to sign the read document D that is to be read. If the request is from a user who is welcome to obtain the output of the job, the user with the registered signature can choose to sign the read document D; if the request is from a user who is not welcome to obtain the output of the job, the user with the registered signature can choose not to sign the read document D. In this way, it is possible to reliably prevent unconditional execution of jobs based on document image data.

When the job execution portion 10 is made to execute a job based on document image data, a process in which a document signature image of which the degree of match with a registered signature image is equal to or higher than the first threshold value is erased may be performed by the control portion 1. It is then possible also to restrict execution of a job of which the reading target is the output of a job based on the document image data. When the image forming apparatus 100 is made to execute a job of which the reading target is such an output, the user with the registered signature has to be requested to sign the output.

According to the embodiment, as described above, when the read document D is the condition-fulfilling document D', if the specific signature image of which the degree of match with the document signature image is equal to or higher than the first threshold value is stored in the storage portion 2, the control portion 1 permits execution of a job based on the document image data; if the specific signature image of which the degree of match with the document signature image is equal to or higher than the first threshold value is not stored in the storage portion 2, the control portion 1 inhibits execution of a job based on the document image data. With this configuration, unless a user who registered the specific signature image signs the read document D to be read, no job based on the document image data is executed. It is thus possible to more reliably prevent execution of a job based on the document image data. A user then has only to put a character string such as "CONFIDENTIAL" or "FOR INTERNAL USE ONLY" (predetermined information) on the read document D to obtain enhanced security (to more reliably prevent leakage of the content of a sensitive document), and this is convenient to the user.

According to the embodiment, as described above, when the read document D is not the condition-fulfilling document D', if the degree of match between any registered signature image including the specific signature image and the document signature image is equal to or higher than the first threshold value, the control portion 1 permits execution of a job based on the document image data; if no registered signature image of which the degree of match with the document image data is equal to or higher than the first threshold value is stored in the storage portion 2, the control portion 1 inhibits execution of a job based on the document image data. With this configuration, even when the read document D is not the condition-fulfilling document D', it is possible to restrict execution of a job based on the document image data. Moreover, any user who registered a signature can be requested to sign the read document D to be read, and this saves the trouble of finding a user who registered a signature.

A registered signature image may be obtained illicitly and a printout (such as a sticker) of the registered signature image may be affixed in the signature box C of the read document D. In such a case, the document signature image is identical with the registered signature image, and thus the degree of match between the document signature image and the registered signature image is higher than the first threshold value.

To cope with that, according to the embodiment, even if the degree of match between the document signature image and the registered signature image is equal to or higher than the first threshold value, if the degree of match between the document signature image and the registered signature image is equal to or higher than a prescribed second threshold value higher than the first threshold value, the control portion 1 inhibits execution of a job based on the document image data. Thus, even if a registered signature image is obtained illicitly and a printout of the registered signature image is affixed in the signature box C of a document D, it is possible to prevent execution of a job based on the document image data of the document D.

According to the embodiment, as described above, when a user who is requesting execution of a job based on document image data is a specific user, execution of the job is not inhibited. A specific user thus does not need to get someone's signature on a document D to be read, and this is convenient to him.

According to the embodiment, as described above, when the control portion 1 permits execution of a job based on document image data, it recognizes the set content of the job settings indicated by the job setting information associated with a registered signature image of which the degree of match with the document signature image is equal to or higher than the first threshold value, and makes the job execution portion 10 execute the job according to the thus recognized set content. It is thus possible to have a job executed according to the settings intended by a user with a registered signature.

The embodiment disclosed herein should be understood to be in every aspect illustrative and not restrictive. The scope of the present disclosure is defined not by the description of the embodiment given above but by the appended claims, and encompasses any modifications made in a sense and scope equivalent to those of the claims.

What is claimed is:

1. An image forming apparatus comprising:
   an image reading portion that reads a document to generate document image data;
   a job execution portion that executes a job based on the document image data;
   a control portion that controls the job execution portion; and
   a storage portion that stores a registered signature image which is an image of a previously registered signature,
   wherein the control portion determines a degree of match between a document signature image, which is an image included in the document image data and corresponding to a signature written on the document, and the registered signature image so that, if the degree of match between the document signature image and the registered signature image is equal to or higher than a prescribed first threshold value, the control portion permits execution of the job and, if the degree of match between the document signature image and the registered signature image is lower than the first threshold value, the control portion inhibits execution of the job.

2. The image forming apparatus according to claim 1, wherein
   based on the document image data, the control portion checks whether or not the document is a condition-fulfilling document that fulfills a prescribed condition so that, when the document is the condition-fulfilling document, the control portion decides whether or not to permit execution of the job based on the degree of match between the document signature image and the registered signature image.

3. The image forming apparatus according to claim 2, wherein
   the registered signature image includes a specific signature image which is an image of a specific signature, and
   when the document is the condition-fulfilling document,
      if the specific signature image of which the degree of match with the document signature image is equal to or higher than the first threshold value is stored in the storage portion, the control portion permits execution of the job and,
      if the specific signature image of which the degree of match with the document signature image is equal to or higher than the first threshold value is not stored in the storage portion, the control portion inhibits execution of the job.

4. The image forming apparatus according to claim 3, wherein
   even if the document is not the condition-fulfilling document, the control portion decides whether or not to permit execution of the job based on the degree of match between the document signature image and the registered signature image, and
   when the document is not the condition-fulfilling document,
      if the degree of match between any of the registered signature image including the specific signature image and the document signature image is equal to or higher than the first threshold value, the control portion permits execution of the job and,
      if the registered signature image of which the degree of match with the document signature image is equal to or higher than the first threshold value is not stored in the storage portion, the control portion inhibits execution of the job.

5. The image forming apparatus according to claim 1, wherein
   even if the degree of match between the document signature image and the registered signature image is equal to or higher than the first threshold value, if the degree of match between the document signature image and the registered signature image is equal to or higher than a prescribed second threshold value higher than the first threshold value, the control portion inhibits execution of the job.

6. The image forming apparatus according to claim 1, wherein
   the storage portion stores specific user information which is information on a specific user, and
   based on the specific user information, the control portion checks whether or not a user currently logged in the image forming apparatus is the specific user so that, if the user currently logged in the image forming apparatus is the specific user, the control portion permits execution of the job without deciding whether or not to permit execution of the job based on the degree of match between the document signature image and the registered signature image.

7. The image forming apparatus according to claim 1, wherein
   the storage portion stores job setting information indicating set content of previously registered job settings in association with the registered signature image, and
   when the control portion permits execution of the job, the control portion recognizes set content of job settings indicated by job setting information associated with the registered signature image of which the degree of match with the document signature image is equal to or higher than the first threshold value, and makes the job execution portion execute the job according to the recognized set content.

* * * * *